United States Patent [19]

Hagelstein

[11] Patent Number: 4,589,113
[45] Date of Patent: May 13, 1986

[54] SHORT WAVELENGTH LASER

[75] Inventor: Peter L. Hagelstein, Livermore, Calif.

[73] Assignee: The United States of America as represented by the United States Department of Energy, Washington, D.C.

[21] Appl. No.: 623,876

[22] Filed: Jun. 25, 1984

[51] Int. Cl.$^4$ .............................................. H01S 3/30
[52] U.S. Cl. ......................................... 372/5; 372/39; 372/76; 372/70
[58] Field of Search ................... 372/5, 69, 70, 66, 76, 372/23, 39

[56] References Cited

U.S. PATENT DOCUMENTS 4,267,525 5/1981 Silfvast .................................. 372/76

OTHER PUBLICATIONS

Vekhov et al., "Possib. of Using Metastable Heliumlike Ions in Gener. of Ultrasoft X-Ray Stimulated Radiation"; Sov. JQE, vol. 5, No. 6, Jun. 1975.
Zherikhin et al., "Gain in the Far Vacuum Ultraviolet Region Due to Trans. in Multiply Charged Ions"; Sov. JQE, vol. 6, No. 1, Jan. 1, 1976.
Vinogradov et al., "Population Inversion of Transitions in Neon-Like Ions", Sov. JQE, vol. 7, No. 1, Jan. 1977.
Reintjes et al., "Extended Plasma Source for Short-Wavelength Amplifiers", Opt. Lett., vol. 3, No. 2, Aug. 1978.

Primary Examiner—Léon Scott, Jr.
Attorney, Agent, or Firm—Gary C. Roth; Clifton E. Clouse, Jr.; Judson R. Hightower

[57] ABSTRACT

A short wavelength laser (28) is provided that is driven by conventional-laser pulses (30, 31). A multiplicity of panels (32), mounted on substrates (34), are supported in two separated and alternately staggered facing and parallel arrays disposed along an approximately linear path (42). When the panels (32) are illuminated by the conventional-laser pulses (30, 31), single pass EUV or soft x-ray laser pulses (44, 46) are produced.

8 Claims, 7 Drawing Figures

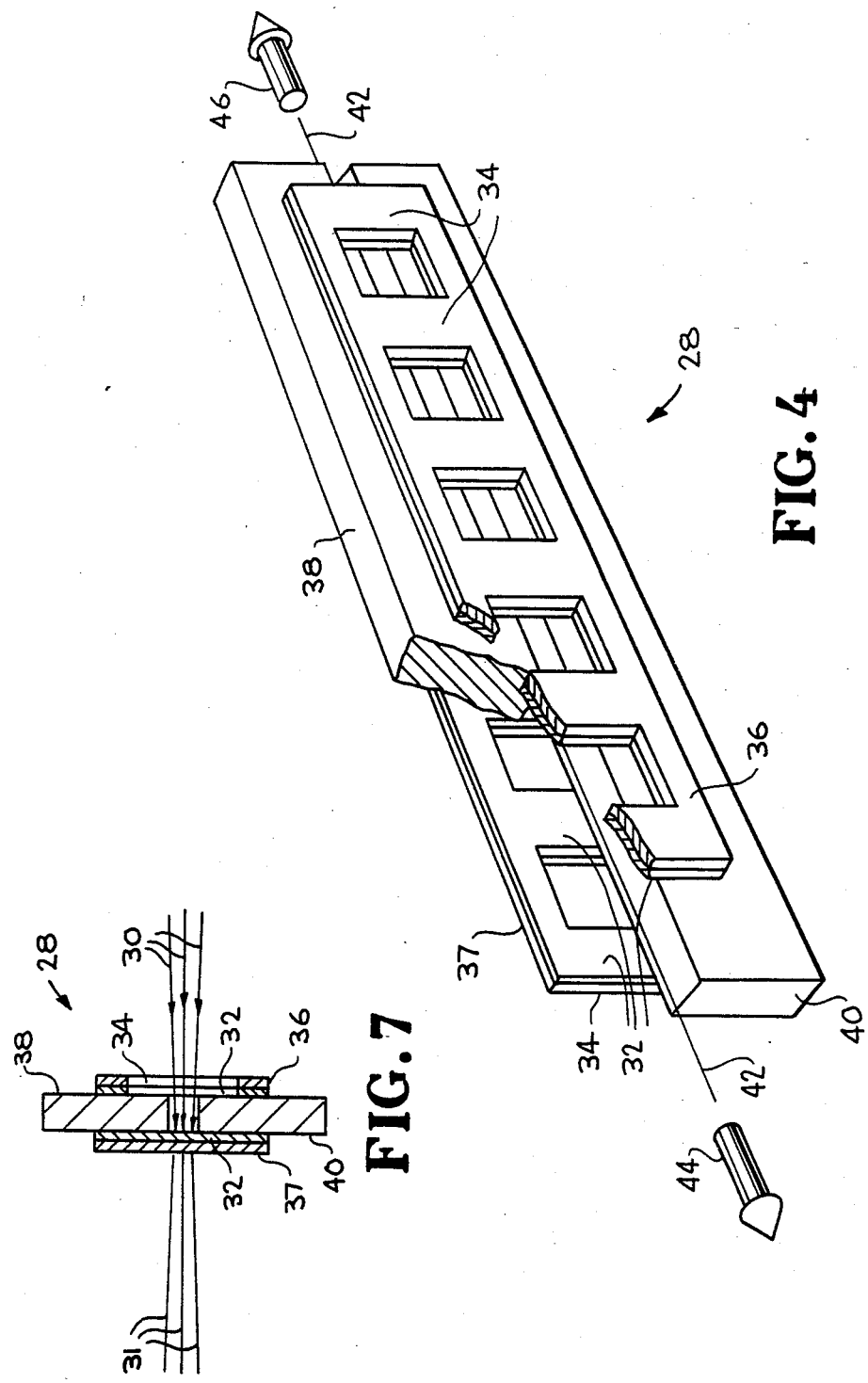

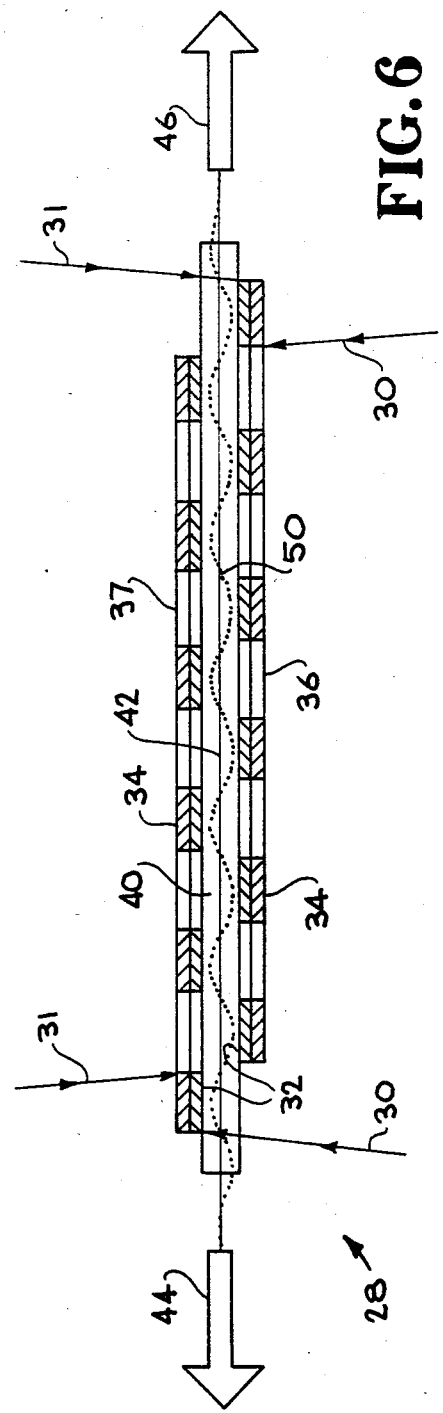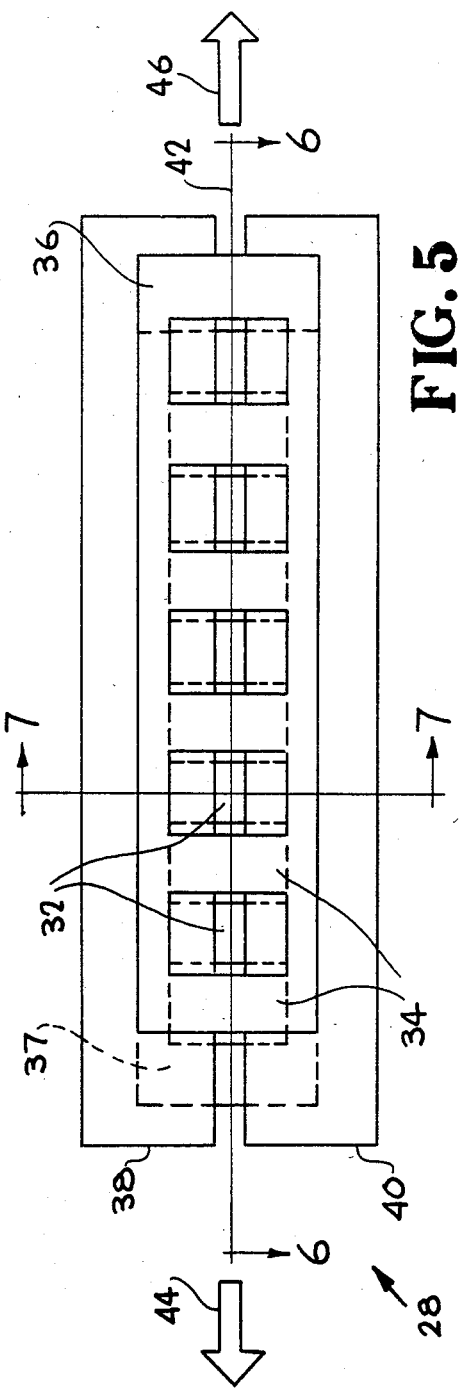

SHORT WAVELENGTH LASER

The United States Government has rights in this invention pursuant to Contract No. W-7405-ENG-48 between the U.S. Department of Energy and the University of Calif. for the operation of the Lawrence Livermore National Laboratory.

BACKGROUND OF THE INVENTION

The invention described herein relates generally to short wavelength lasers, and more particularly to electron collisionally-excited EUV (extreme ultraviolet) or soft X-ray lasers.

During a period extending back from the present time for more than two decades, an intense search has been underway for ways of achieving, in the laboratory, laser emission at EUV or soft X-ray wavelengths. Coherent beams of photons produced by these lasers will have many beneficial scientific purposes, such as submicroscopic imaging, holography and spectroscopy. Although population inversions in plasmas, such as may be expected to lead to EUV or soft X-ray lasing, have been reported, no conventional-laser-driven EUV or soft X-ray laser has yet been reported.

One proposed generic conventional-laser-driven short wavelength laser scheme that is currently being actively studied is the electron collisionally-excited approach that is dissussed by Zherikhin et al in Sov. J. Quant. Electron. 6, 82 (1976). Zherikhin et al point out that electron collisions may establish a population inversion in ions with a ground electronic configuration $1s^2 2s^2 2p^m$ as a result of $2p^{m-1}3s - 2p^{m-1}3p$ transitions. The upper state $2p^{m-1}3p$ decays radiatively most effectively to the $2p^{m-1}3s$ state, which, in its turn, decays radiatively and very rapidly to the ground state, whereas the radiative decay of the $2p^{m-1}3p$ state to the ground state is forbidden. Both of the inverted laser state levels are populated from the ground state as the result of electron impact. Zherikhin et al state that neon-like ions are most suitable for this scheme because, due to a jump of the ionization potential between ions with outer L shell electrons to ions with outer M shell electrons, and even though fast ion recombination may occur in an expanding plasma, among ions with the $2p^m$ configuration neon-like ions with the $2p^6$ configuration are the longest-lived. Neon-like ions are atoms having an atomic number greater than ten that are stripped of all but ten of their usual compliment of electrons. Zherikhin et al calculate appreciable gains for plasmas composed of neon-like ions of elements in the atomic number range from 16 to 25 heated by two-stage laser pumping wherein the electron component of a previously generated laser plasma filament is rapidly heated by an ultrashort pulse of high-power laser radiation traveling along the plasma filament. Because of theoretical difficulties, Zherikhin et al state that it is not clear whether the method can be extended to high atomic number plasma systems.

Vinogradov et al in Sov. J. Quantum Electron. 7, 32 (1977), in considering tne electron collisionally-excited approach to conventional-laser-driven short wavelength lasing under discussion, theoretically conclude that 3p-3s transitions can be inverted in optically thin steady-state plasmas comprising neon-like ions carrying a charge between 7 and 15. Specific numerical results are given for the Ca XI ion. Calcium has the atomic number 20. An important finding of Vinogradov et al is that two-stage laser pumping is not an absolute theoretical requirement of this electron collisionally-excited method.

As currently understood, the electron collisionally-excited single pass EUV or soft X-ray laser scheme involves using a driving conventional laser to produce a mid- to high-density plasma of neon-like ions. Strong monopole electron collisional excitation from the ground state of the neon-like ions fills 3p states. This inverts 3p to 3s transitions because the lower energy 3s states radiatively decay very rapidly. Although the physics of the scheme is complex, it is nevertheless believed that strong 3p excitations may occur for neon-like ions produced from elements having an atomic number near 36 in systems driven by 0.53 micron wavelength laser light at an intensity of about $10^{14}$ watts/cm$^2$. The gain, usually stated in terms of reciprocal centimeters, of a transition produced by this scheme is believed to be a function of the parameters of the driving conventional-laser pulse, the atomic number of the element comprising the plasma, the free electron density of the plasma, the electron temperature of the plasma, and, because of the potential of radiation trapping, the dimensions of the plasma. Two-stage laser pumping is not required.

An attempt was made to experimentally test the electron collisionally-excited single pass EUV or soft X-ray laser scheme at the NOVETTE laser facility of the Lawrence Livermore National Laboratory. The experimental arrangement is schematically shown in FIG. 1, prior art, to which reference is now made. Laser pulse 10, comprised of a 200 picosecond full width at half maximum amplitude, 0.53 micron wavelength, cylindrically focused light pulse having an average intensity of approximately $10^{14}$ watts/cm$^2$, was directed onto selenium panel 12, which was approximately 1,000 Angstroms thick. Selenium panel 12 was coated on parylene substrate 14, which was approximately 0.5 microns thick. Parylene substrate 14 was supported within aluminum trough 16. Laser pulse 10 caused a plasma, formed from blown-off selenium atoms, to come into existence adjacent to selenium panel 12. According to calculations performed on the Lawrence Livermore National Laboratory LASNEX computer code, and other computer codes, conditions within the plasma should have been such as to produce lasing emission at approximately 68 eV from neon-like selenium atoms by the electron collisionally-excited mechanism. Particularly, according to the calculations, the plasma was expected to have, over an extended period of time, the electron density and gain, as functions of the distance from the surface of selenium panel 12, shown in FIG. 2, prior art, and in FIG. 3, prior art, respectively. During the lasing time, the plasma was expected to have an approximately constant electron temperature of about 800 to 1500 eV. An X-ray detector which was carefully adjusted to measure radiation in the 58 to 78 eV energy range that was within an approximately 0.005 radian acceptance angle, monitored axial radiation emission, in a direction through the plasma and parallel to the surface of selenium panel 12, from the high gain portion of the plasma that was confined within approximately 30 microns of the surface of selenium panel 12. Laser amplification was not detected. Since the plasma was optically thin on the 2p to 3s line coupling the ground state to the lower laser state, radiation trapping is an unlikely cause of this null result.

Thus, even though the theory underlying the generic electron collisionally-excited single pass conventional-laser-driven short wavelength laser mechanism is believed to be valid, it is not known how to construct an operational short wavelength laser of this type.

SUMMARY OF THE INVENTION

It is therefore an object of the invention to provide an operational conventional-laser-driven electron collisionally-excited single pass amplified spontaneous emission short wavelength laser.

Another object of the invention is to provide method and apparatus for establishing an electron collisionally-excited gain medium that laser amplifies 3p-3s transition EUV or soft X-ray radiation along an approximately linear path.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention may comprise providing a multiplicity of substantially flat panels each mounted upon a separate and individual substantially flat substrate. Preferably each of the panels is comprised of a single element selected from the group consisting of all elements having an atomic number in the inclusive range from 32 to 42, with each panel having a thickness in the approximate range from 1500 to 4000 Angstroms. It is also preferred that each substrate be comprised of a material selected from the group consisting of formvar, parylene, and aluminum, with each substrate having a thickness of at least approximately 0.5 microns. The multiplicity of substantially flat panels are supported in two separated and alternately staggered facing and parallel arrays disposed along an approximately linear path. Preferably the facing and parallel arrays are separated with a gap of approximately 50 microns between them, with each panel being approximately 1 millimeter long in the direction along the approximately linear path, and with the adjacent panels in each array being separated by approximately 1.3 millimeters. When each panel is illuminated by a conventional-laser pulse, a multiplicity of plasmas is produced, with each plasma having an approximately exponential decaying electron density gradient extending out from the surface of its respective panel. The plasmas together provide a gain medium that laser amplifies 3p-3s transition EUV or soft X-ray radiation along the approximately linear path.

The benefits and advantages of the present invention, as embodied and broadly described herein, include, inter alia, the provision of an operational conventional-laser-driven electron collisionally-excited single pass short wavelength laser establishing a gain medium that laser amplifies 3p-3s transition EUV or soft X-ray radiation along an approximately linear path.

BRIEF DESCRIPTION OF THE DRAWINGS

The accompanying drawings, which are incorporated into and form a part of the specification, illustrate an embodiment of the invention and, together with the description, serve to explain the principles of the invention. In the drawings:

FIG. 4 is a schematic view of an electron collisionally-excited single pass short wavelength laser in accordance with the invention.

FIG. 5 is an elevation view of the electron collisionally-excited single pass short wavelength laser of FIG. 4.

FIG. 6 is a cross sectional plan view of the electron collisionally-excited single pass short wavelength laser of FIG. 4, taken generally along line 6—6 in FIG. 5.

FIG. 7 is a cross sectional side view of the electron collisionally-excited single pass short wavelength laser of FIG. 4, taken generally along line 7—7 in FIG. 5.

DETAILED DESCRIPTION OF THE INVENTION

Figure 1:
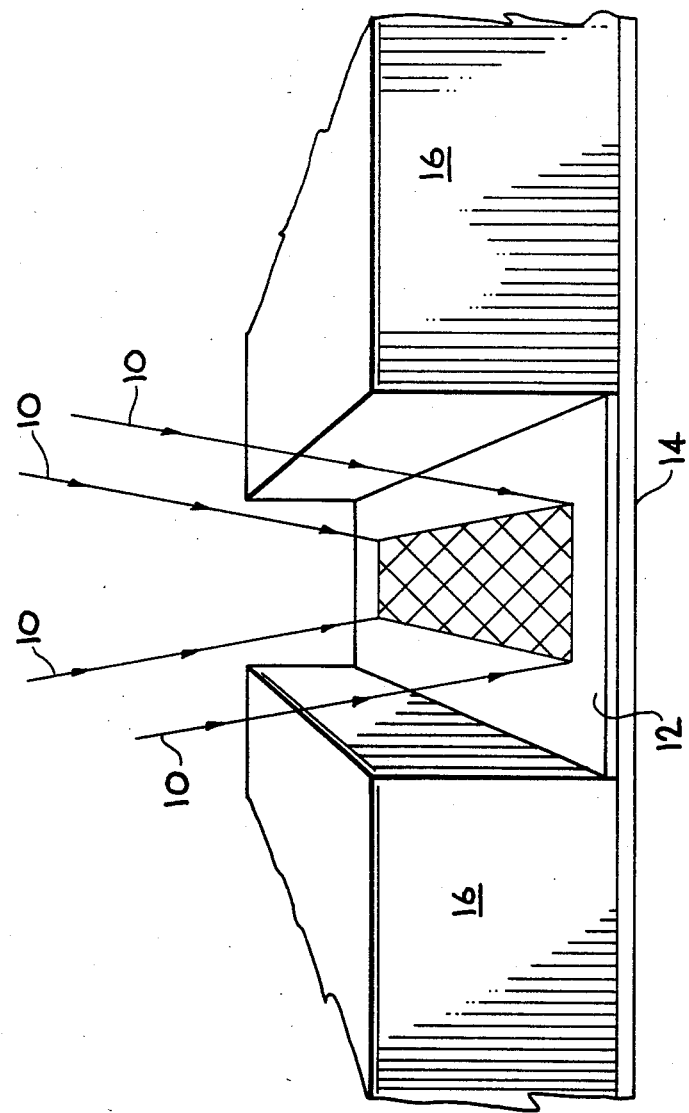
FIG. 1 is a schematic view showing an unsuccessful prior art attempted experimental test of the electron collisionally-excited single pass short wavelength laser scheme.
Figure 2:
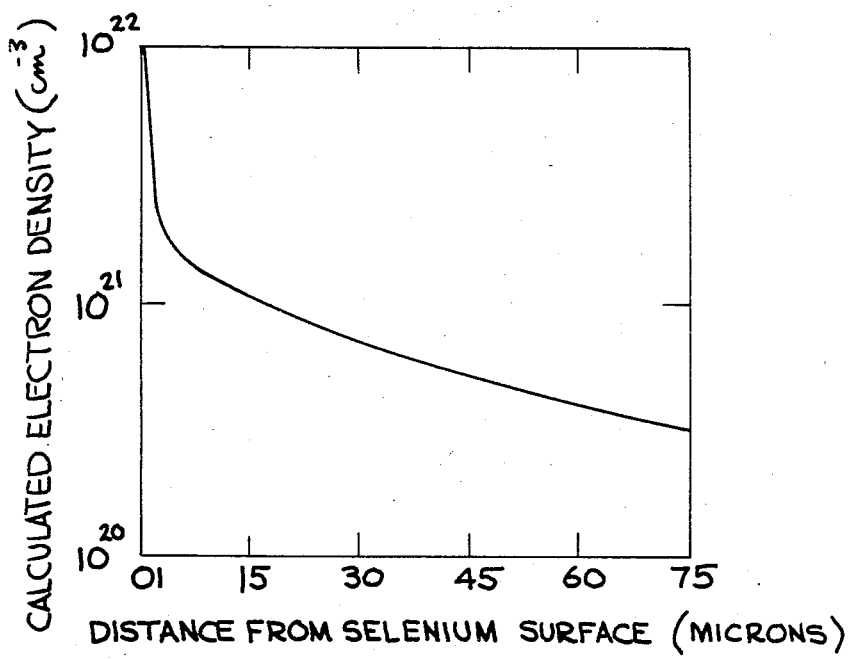
FIG. 2 is a graph showing calculated electron density as a function of distance, for the prior art attempted experimental test of FIG. 1.
Figure 3:
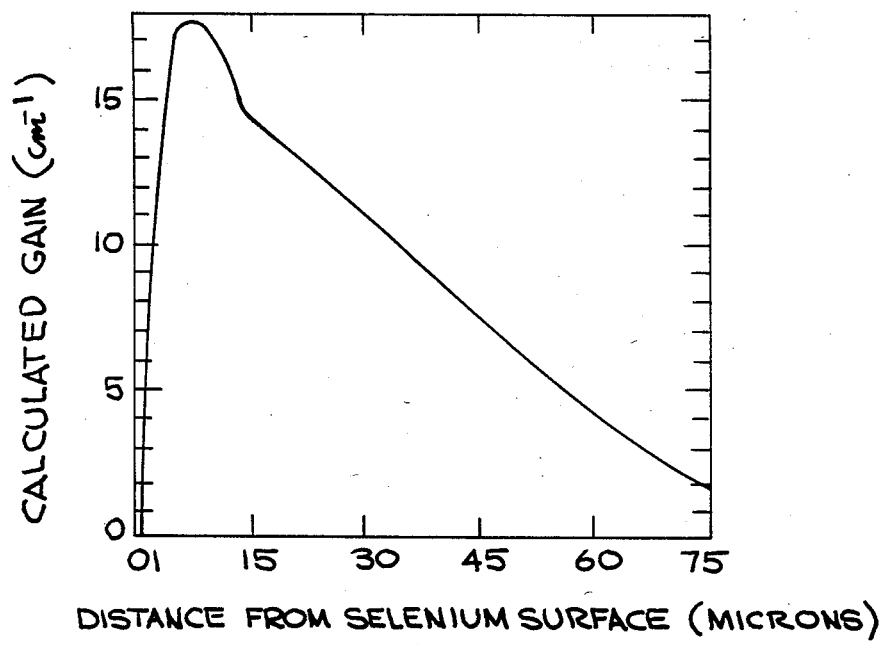
FIG. 3 is a graph showing calculated gain as a function of distance, for the prior art attempted experimental test of FIG. 1.

Reference has been made above to FIG. 1 which shows a schematic view of an unsuccessful prior art attempted experimental test of the electron collisionally-excited single pass EUV or soft X-ray laser scheme. Reference has also been made above to FIG. 2 which is a graph showing calculated electron density as a function of distance for the prior art attempted experimental test of FIG. 1, and to FIG. 3 which is a graph showing calculated gain as a function of distance for the prior art attempted experimental test of FIG. 1. It is believed that a reason why no laser amplified short wavelength radiation was detected as having been produced by the prior art electron collisionally-excited single pass EUV or soft X-ray laser of FIG. 1, is because index of refraction gradients in the plasma created by laser pulse 10 were sufficient to bend the trajectory of any laser amplified 3p-3s transition EUV or soft X-ray radiation so that it was not within the acceptance angle of the X-ray detector. Just as light is bent by index of refraction gradients or changes, the same is true for any form of electromagnetic radiation, including X-rays. In other words, in the plasma, any ultraviolet radiation or X-rays, being photons, were bent by index of refraction gradients away from regions of high electron density, wherein the phase velocity of light is higher than in regions of lesser electron density. Thus it is believed that any axial short wavelength laser emission, from the high gain portion of the plasma that was confined within approximately 30 microns of the surface of selenium panel 12, traveling intiially in a direction through the plasma and parallel to the surface of selenium panel 12, would while undergoing a very modest amount of amplification, at the same time be bent and turned away from the high electron density and high gain portion of the plasma. The X-ray detector would have missed such a laser signal. It is consequently also believed that the prior art electron collisionally-excited single pass short wavelength laser as shown in FIG. 1 can at best produce a low-intensity, broad and diffusely directed EUV or soft X-ray laser beam.

Reference will now be made in detail to the present preferred embodiment of the invention, an example of which is illustrated in the accompanying drawings. Reference is made concurrently to FIGS. 4, 5, 6 and 7 which show a schematic, an elevation, a cross sectional plan, and a cross sectional side view, respectively, of an electron collisionally-excited single pass EUV or soft X-ray laser, 28, that provides a gain medium that laser amplifies 3p-3s transition EUV or soft X-ray radiation along an approximately linear path 42, in accordance with the invention. The particular mechanical assembly used in the practice of this invention is not critical, and many differently constructed short wavelength lasers may be made that are highly efficacious and in accordance with the invention. The short wavelength laser, 28, is driven by conventional-laser pulses 30 and 31 which are each focused to a rectangular area of approximately 1.25 cm by 0.015 cm by cylindrical lenses. Each of the two simultaneous conventional-laser pulses 30 and 31 should have a full width at half maximum amplitude in the approximate range from 150 to 350 picoseconds, a wavelength of approximately 0.53 microns, and an average intensity in the focal plane in the approximate range from $4 \times 10^{13}$ to $1.5 \times 10^{14}$ watts/cm$^2$. However, in other embodiments of the invention, conventional laser pulses 30 and 31 may be comprised of light having a wavelength in the approximate range from 0.2 to 2 microns.

The lasing gain medium of short wavelength laser 28 is ultimately provided by atoms from substantially flat panels 32 which are mounted upon locally separate substantially flat substrates 34. Except where attached to panels 32, all or some of substrates 34 may form part of a larger common part. In particular, in the embodiment shown, substrates 34 all form parts of two sheets, namely sheet 36 on the front of short wavelength laser 28 and sheet 37 on the back of short wavelength laser 28. Panels 32 may be attached to substrates 34 by any appropriate means, such as, for example, by vapor deposition or by sputtering. It is preferred that each of panels 32 be comprised of a single element selected from the group consisting of all elements having an atomic number in the inclusive range from 32 to 42, with a thickness in the approximate range from 1500 to 4000 Angstroms. It is also preferred that each of substrates 34 be comprised of a material selected from the group consisting of formvar, parylene, and aluminum, and have a thickness of at least approximately 0.5 microns. Formvar is comprised of polyvinyl formal resins and is manufactured by Shawinigan Resin Corporation of Englewood Cliffs, New Jersey. However, in other embodiments of the invention substrates 34 may be comprised of any structural material. Sheets 36 and 37 are held spaced apart from one another by being mounted upon, for example by gluing, upper spacer 38 and lower spacer 40. Spacers 38 and 40 are each comprised of any structural material such as aluminum, iron, or gold, for example, and are each approximately 50 microns thick. The other dimensions of spacers 38 and 40 are not critical, so long as they are long enough to make full use of the rectangular focal plane of conventional-laser pulses 30 and 31. For example, spacers 38 and 40 may each have the approximate dimensions of 50 microns by 1.5 cm by 0.5 cm. Spacers 38 and 40 are separated by approximately 200 microns.

As shown in FIGS. 4 to 7, panels 32 are supported in two separated and alternately staggered facing and parallel arrays disposed along an approximately linear path 42. It is preferred, as determined by the thicknesses of spacers 38 and 40, that the alternately staggered facing arrays be separated with a gap of approximately 50 microns therebetween. It is preferred that each of panels 32 be approximately 1 millimeter long in the direction along approximately linear path 42, with adjacent panels 32 in each array being separated by approximately 1.3 millimeters. It is further preferred that each array of panels be comprised of 6 members, giving a total number of 12 for panels 32. However, in other embodiments of the short wavelength laser of the invention different numbers of panels may be advantageously used.

When conventional-laser pulses 30 and 31 illuminate panels 32, as shown, a multiplicity of plasmas are produced. These plasmas, each having an approximately exponential decaying electron gradient extending out from the surface of its respective panel 32, provide a gain medium that laser amplifies 3p-3s transition EUV or soft X-ray radiation along approximately linear path 42. EUV or soft X-ray laser pulses 44 and 46 exit short wavelength laser 28, as shown As pulses 44 and 46 each develop and travel along approximately linear path 42, they are repeatedly turned back into media of high gain by symmetrically placed and opposing media of high gain. The EUV or soft X-rays are amplified and bent to the right, then they are amplified and bent to the left, and then the process is repeated until pulses 44 and 46 exit short wavelength laser 28. This is schematically indicated by the curved line 50 of FIG. 6.

It is thus appreciated that in accordance with the invention as herein described and shown in FIGS. 4 to 7, an operational conventional-laser-driven electron collisionally-excited single pass short wavelengtn laser is provided that establishes a gain medium that laser amplifies 3p-3s transition EUV or soft X-ray radiation along an approximately linear path.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the flat surfaces of upper and lower spacers 38 and 40 that are adjacent to the approximately linear path 42 may each be coated with a thin layer of selenium so that, in the event of blow-off, the selenium atoms entering the plasma would not interfere with the lasing process, but would rather provide directional correction in the transverse or up-down direction. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method, for providing an electron collisionally-excited single pass amplified spontaneous emission short wavelength laser gain medium that laser amplifies 3p-3s transition EUV or soft X-ray radiation along an approximately linear path, the method comprising the step of:
   producing a multiplicity of plasmas arrayed in two separated and alternately staggered parallel arrays disposed along said approximately linear path, with each said plasma having an approximately exponential decaying electron density gradient extending perpendicularly inward toward said approximately linear path.

2. A method, for providing a conventional-laser driven electron collisionally-excited single pass amplified spontaneous emission short wavelength laser gain medium that laser amplifies 3p-3s transition EUV or soft X-ray radiation along an approximately linear path, the method comprising the step of:

producing a multiplicity of plasmas by illuminating, with conventional-laser radiation, a multiplicity of substantially flat panels, with each said panel mounted upon a separate and individual substantially flat substrate, with said panels arrayed in two separated and alternately staggered facing and parallel arrays disposed along said approximately linear path, so that each said plasma has an approximately exponential decaying electron density gradient extending out from the surface of its respective said panel, to thereby provide said gain medium.

3. An electron collisionally-excited single pass amplified spontaneous emission short wavelength laser, that provides a gain medium that laser amplifies 3p-3s transition EUV of soft X-ray radiation along an approximately linear path, driven by a pair of conventional-laser pulses, the short wavelength laser comprising:

a multiplicity of substantially flat panels, with each said panel mounted upon a separate and individual substantially flat substrate; and means for supporting said multiplicity of panels in two separated and alternately staggered facing and parallel arrays disposed along said approximately linear path, so that when said pair of conventional-laser pulses illuminate said panels and thereby produce a multiplicity of plasmas with each said plasma having an approximately exponential decaying electron density gradient extending out from the surface of its respective said panel, said gain medium that laser amplifies 3p-3s transistion EUV or soft X-ray radiation along said approximately linear path is provided.

4. An electron collisionally-excited single pass short wavelength laser, as recited in claim 3, in which each of said substantially flat panels is comprised of a single element selected from the group consisting of all elements having an atomic number in the inclusive range from 32 to 42, and in which each of said substantially flat panels has a thickness in the approximate range from 1500 Angstroms to 4000 Angstroms.

5. An electron collisionally-excited single pass short wavelength laser, as recited in claim 3, in which each of said substrates is comprised of a material selected from the group consisting of formvar, parylene, and aluminum, and in which each of said substrates has a thickness of at least approximately 0.5 microns.

6. An electron collisionally-excited single pass short wavelength laser, as recited in claim 3, in which said two separated and alternately staggered facing and parallel arrays are separated with a gap of approximately 50 microns therebetween, and in which each of said substantially flat panels is approximately 1 millimeter long in the direction along said approximately linear path, with adjacent said substantially flat panels in each array being separated by approximately 1.3 millimeters.

7. An electron collisionally-excited single pass short wavelength laser, as recited in claim 6, in which said pair of conventional-laser pulses illuminate an area, immediately adjacent to said approximately linear path and approximately 0.015 centimeters wide, along each of said approximately 1 millimeter long substantially flat panels.

8. An electron collisionally-excited single pass short wavelength laser, as recited in claim 3, in which said supporting means, at locations adjacent to said approximately linear path, is coated with the same substance that comprises said panels, so that, in the event of blow-off, atoms entering the gain medium from said supporting means will not interfere with the lasing process but will rather provide additional directional correction to said gain medium.

* * * * *